United States Patent [19]

Lauter

[11] 3,991,308

[45] Nov. 9, 1976

[54] MULTIFLASH UNIT, PARTICULARLY FLASHCUBE

[75] Inventor: Friedrich Lauter, Augsburg, Germany

[73] Assignee: Patent-Treuhand-Gesellschaft für Elektrische Glühlampen mbH, Munich, Germany

[22] Filed: Mar. 28, 1975

[21] Appl. No.: 563,185

[30] Foreign Application Priority Data

Apr. 25, 1974 Germany............................ 2420172

[52] U.S. Cl. .............................. 240/1.3; 240/103 R
[51] Int. Cl.[2] ............................................ G03B 15/02
[58] Field of Search ........................ 240/1.3, 103 R; 354/126, 127; 431/93, 95

[56] References Cited
UNITED STATES PATENTS

| | | |
|---|---|---|
| 3,358,131 | 12/1967 | Bennett et al. ...................... 240/1.3 |
| 3,513,304 | 5/1970 | Ott ....................................... 240/1.3 |
| 3,517,182 | 6/1970 | Brooks et al. ........................ 240/1.3 |
| 3,860,809 | 1/1975 | Shoupp et al. ....................... 240/1.3 |

*Primary Examiner*—Fred L. Braun
*Attorney, Agent, or Firm*—Flynn & Frishauf

[57] ABSTRACT

A reflector body for flashcubes containing mechanically ignitable flashbulbs, said reflector body having a base edge length of ≤ 25 mm and a ratio of base edge length to lateral edge length of ≥ 1 and forming four individual reflectors. The individual reflectors are formed by two planes forming a right angle and by a cylindrical area interconnecting the two planes. At the top end, the plane reflector areas merge across cylindrical and spherical areas into triangular cover planes, at the bottom end, the two planes merge into cylindrical areas.

3 Claims, 5 Drawing Figures

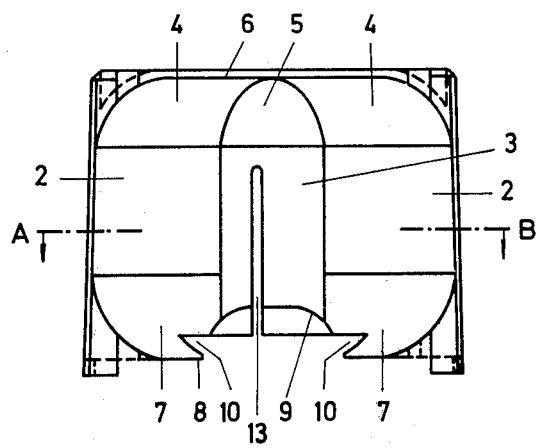
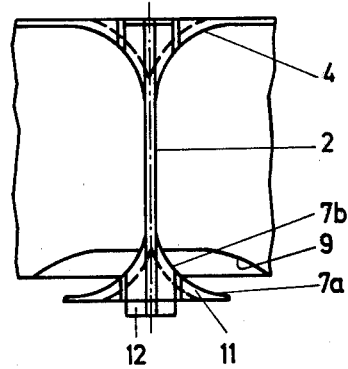
FIG.1  FIG.3
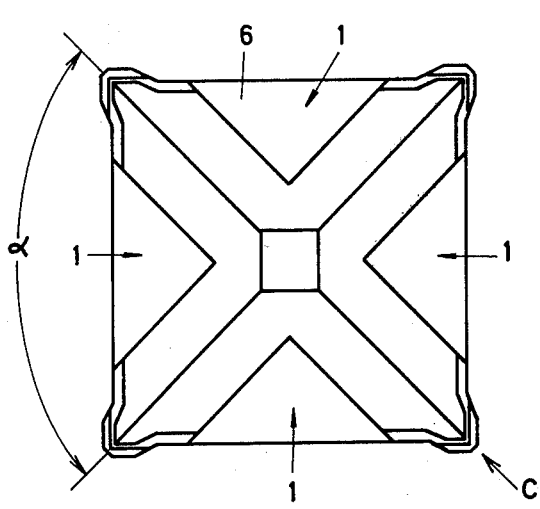
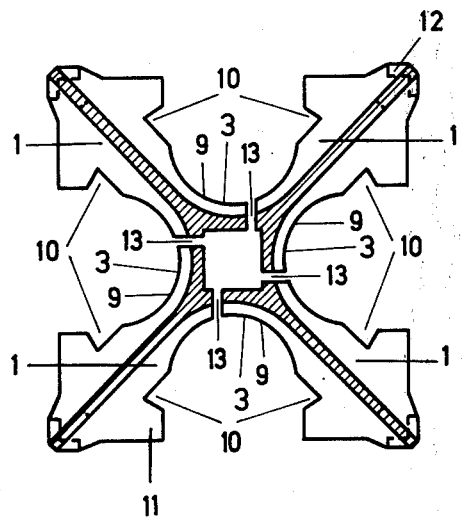
FIG.2  FIG.4

MULTIFLASH UNIT, PARTICULARLY FLASHCUBE

The present invention relates to a multiflash unit, especially of the flashcube type, and more particularly to a reflector structure used therein.

Flashcubes have a base edge length of ≤ 25 mm and a ratio of base edge length to lateral edge length of ≥ 1 with a substantially square mounting plate and an integrally formed socket holder to secure it to a camera. Four mechanically ignitable flashbulbs are secured to the mounting plate. The flashbulbs, each, have an overall length of ≤ 22 mm and an outer bulb diameter of ≤ 7.5 mm. Associated with the flashbulbs are four individual reflectors formed from a single reflector body. Means for igniting the lamps are provided. A cube shaped, radiation transmissive cover seated on the mounting plate encloses the flashbulbs, the reflector body and the ignition means.

It is an object of the present invention to devise, for multiflash units of this type, a perfectly suited reflector body forming the four individual reflectors.

Subject matter of the present invention: The reflector body forms four individual reflectors with an aperture angle of 90°, formed by two planes arranged at an angle of 90° to each other and connected at the apex formed by said planes by an inner cylindrical section area matched in radius to the flashbulb diameter, merging in their upper portion across upper cylindrical and spherical section areas into a triangular plane which is perpendicular to the aforesaid planes and defined by the top edge of the reflector body, and merging in their lower portion into lower cylindrical section areas which are defined by the bottom edge of the reflector body and by a slot formed concentrically with the inner cylindrical area of the reflector apex.

The lower cylindrical section areas of the lower reflector portion may be assembled from two sub-section areas of different radii.

The invention will be described by way of example with reference to the accompanying drawings, wherein:

FIG. 1 is a front view of the reflector body;

FIG. 2 is a top view of the reflector body;

FIG. 3 is a partial view of the reflector body in the direction C of FIG. 2;

FIG. 4 is a cut through the reflector body along line A-B of FIG. 1; and

Figure 5:
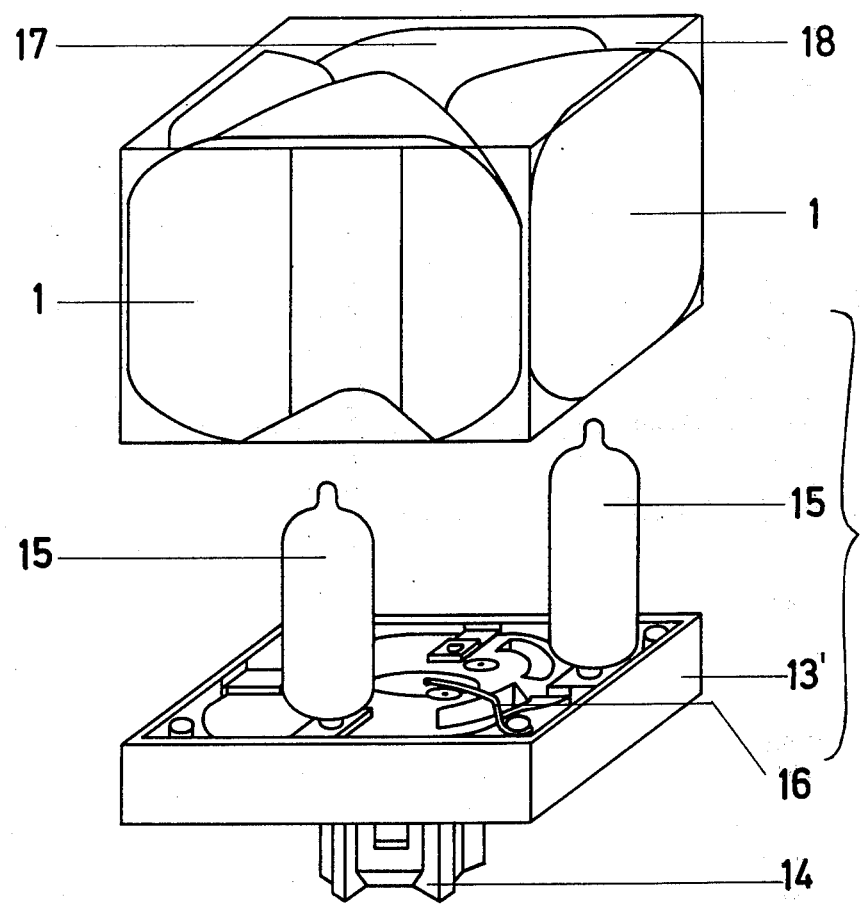
FIG. 5 is an exploded simplified view of a flash cube.

Referring first to FIG. 5: The flash cube has a generally square base plate 13' on which a socket 14 is integrally formed, to provide a unit holder for the flash cube so it can be attached to a camera. Four mechanically ignitable flash lamps 15 are secured to the base plate; only two are shown, for simplicity and for better illustration. A spring ignition element 16 is associated with each one of the flash cubes to strike a small explosive charge in the base of the flash lamp for ignition. The reflector body 17 has four separate reflector units 1, and is surrounded by a transparent, generally cube-shaped cover 18. The reflector body 17 with the four individual reflectors 1 is seated in the base plate 13' by means of lugs 12 (FIG. 3) formed on the reflector body 17.

The reflector body is preferably manufactured from plastic materials by injection molding and forms four individual reflectors 1 with an aperture angle α of about 90°. The aperture angle is, essentially, defined by two rectangular planes 2 which are interconnected at their apex by the inner cylindrical section area 3. The radius of section area 3 is matched to the diameter of the flashbulb. The upper portions of planes 2 merge across the upper cylindrical section areas 4 and the spherical section 5 into a surface 6 of triangular shape extending perpendicularly to planes 2. In their lower portion, planes 2 merge into lower cylindrical section areas 7 which are defined by the bottom edge 8 of the reflector and a slot 9 formed concentrically with the inner cylindrical section area 3. The cut-outs 10 are provided for the igniter mechanism 16 of the mechanically ignitable flashbulbs. The cylindrical section area 7 may be composed of two cylindrical sub-sections 7a and 7b of different radii. It is of particular advantage if the radius of sub-section 7a is larger than the radius of sub-section 7b to prevent a knife edge at the end of flap 11.

The reflector body is provided at its four bottom corners with four lugs 12 to secure the reflector body in the mounting plate 13' of the flashcube. Section areas 3 may be formed with slots 13 to balance manufacturing tolerances. The slots also impart some resiliency to the reflector body.

I claim:

1. A multiflash unit, more particularly a flashcube, having a base edge length of ≤ 25 mm and a ratio of base edge length to lateral edge length of ≥ 1,
    a substantially square mounting plate (13);
    an integrally formed unit holder (14);
    four mechanically ignitable flashbulbs (15), having ignition means, secured to the mounting plate, the flashbulbs having an overall length of ≤ 22 mm and an outer bulb diameter of ≤ 7.5 mm;
    a reflector body (1) having a height of ≤ 20 mm associated with the lamps and forming four individual reflectors;
    means (16) for igniting the lamps;
    and a substantially cube shaped, radiation transmissive cover (18) seated on the mounting plate and enclosing the flashbulbs, the reflector body and the ignition means;
    characterized in that
    the reflector body forms four individual reflectors (1), each, having an aperture angle (α) of about 90° formed by two planes (2) arranged at an angle of about 90° to each other and interconnected at the apex formed by said about 90° angle by an inner cylindrical section area (3) matched in radius to the flashbulb diameter, said reflectors, each, merging in their upper portion by upper cylindrical (4) and spherical (5) section areas into a triangular plane (6) which is perpendicular to the aforesaid planes at about 90° aperture angle and defined by the top edge of the reflector body, and said reflectors, each, merging in their lower portion into lower cylindrical section areas (7) which are defined by the bottom edge (8) of the reflector body and by a slot (9) formed concentrically with the inner section area (3).

2. A multiflash unit as set forth in claim 1, characterized in that the lower cylindrical section areas (7) are formed with two sub-section areas (7a and 7b) and that the radius of one sub-section (7a) is larger than the radius of the other sub-section (7b).

3. A multiflash unit as set forth in claim 1, characterized in that the inner cylindrical section areas (3) are formed with slots (13) to permit minor deformation of the reflectors upon fitting of the reflector body on the mounting plate.

* * * * *